United States Patent
Chu et al.

(10) Patent No.: US 12,326,938 B2
(45) Date of Patent: Jun. 10, 2025

(54) SECURE BOOTING SYSTEM AND OPERATION METHOD THEREOF

(71) Applicant: SAMSUNG ELECTRONICS CO., LTD., Suwon-si (KR)

(72) Inventors: Younsung Chu, Suwon-si (KR); Jisoo Kim, Suwon-si (KR); Sungho Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 18/205,829

(22) Filed: Jun. 5, 2023

(65) Prior Publication Data

US 2024/0078315 A1 Mar. 7, 2024

(30) Foreign Application Priority Data

Sep. 7, 2022 (KR) .................. 10-2022-0113802

(51) Int. Cl.
G06F 21/57 (2013.01)
H04L 9/32 (2006.01)

(52) U.S. Cl.
CPC .......... *G06F 21/575* (2013.01); *H04L 9/3247* (2013.01); *G06F 2221/034* (2013.01)

(58) Field of Classification Search
CPC ............... G06F 21/57; G06F 1/12; G06F 1/32
See application file for complete search history.

(56) References Cited

U.S. PATENT DOCUMENTS

| | | | |
|---|---|---|---|
| 6,907,522 B2 | 6/2005 | Morais et al. | |
| 8,667,580 B2 | 3/2014 | Bhatt et al. | |
| 9,916,452 B2 | 3/2018 | Domke et al. | |
| 10,985,922 B2 | 4/2021 | Zhou et al. | |
| 2003/0229777 A1 | 12/2003 | Morais et al. | |
| 2006/0107320 A1 | 5/2006 | Bhatt et al. | |
| 2017/0085578 A1* | 3/2017 | Ha | G06F 21/50 |
| 2017/0337380 A1 | 11/2017 | Domke et al. | |
| 2019/0103974 A1 | 4/2019 | Zhou et al. | |
| 2022/0067164 A1 | 3/2022 | Liu | |
| 2022/0108018 A1 | 4/2022 | Osorio Lozano et al. | |
| 2022/0342657 A1* | 10/2022 | Amundsen | G06F 9/4401 |
| 2022/0382873 A1* | 12/2022 | Soni | G06F 21/572 |

FOREIGN PATENT DOCUMENTS

KR  10-2089435 B1  3/2020

* cited by examiner

*Primary Examiner* — Keshab R Pandey
(74) *Attorney, Agent, or Firm* — Sughrue Mion, PLLC

(57) ABSTRACT

A booting system includes a firmware release server, an electronic device configured to execute a boot loader and first firmware distributed from the firmware release server, the electronic device including at least one processor, a first storage unit configured to store a secret value shared with the firmware release server, a read-only memory (ROM) configured to store a ROM code executable in booting, a second storage unit configured to store the boot loader and the first firmware, where the ROM code, when executed, causes the at least one processor to perform a verification operation on the boot loader based on the secret value and a first endorsement image received from the firmware release server, and where the boot loader is configured to perform a verification operation on the first firmware based on a second endorsement image received from the firmware release server.

20 Claims, 17 Drawing Sheets

SECURE BOOTING SYSTEM AND OPERATION METHOD THEREOF

CROSS-REFERENCE TO RELATED APPLICATION

This application is based on and claims priority under 35 U.S.C. § 119 to Korean Patent Application No. 10-2022-0113802 filed on Sep. 7, 2022, in the Korean Intellectual Property Office, the disclosure of which is incorporated herein by reference in its entirety.

BACKGROUND

1. Field

One or more example embodiments of the present disclosure relate to a secure booting system and an operation method of the secure booting system.

2. Description of Related Art

In related art, an electronic device may perform a verification operation on a boot loader or firmware when performing a booting operation, and may further load and execute the boot loader or firmware when the verification operation succeeds. For example, a read-only memory (ROM) code stored in a ROM may be executed to verify a digital signature included in the boot loader using with a public key stored in the ROM before the execution of the boot loader. When the verification operation succeeds, the boot loader may be loaded and executed. A boot loader code stored in the boot loader may be executed to verify a digital signature included in the firmware using the public key stored in the boot loader before the execution of the firmware. When the verification operation succeeds, the firmware may be loaded and executed. The above booting operation may be referred to as "public key-based secure booting".

Because the public key-based secure booting requires a long processing time in the booting operation, a hardware accelerator for accelerating the algorithm may be provided. However, among electronic devices, devices such as embedded MultiMediaCard (eMMC) and universal flash storage (UFS) are difficult to include with the hardware accelerator due to size and cost. Accordingly, there is a need for a technology capable of quickly performing secure booting without a hardware accelerator.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

Provided is a secure booting method and a secure booting system which may be capable of quickly performing a secure booting operation without including a hardware accelerator for executing a public key-based encryption algorithm.

Additional aspects will be set forth in part in the description which follows and, in part, will be apparent from the description, or may be learned by practice of the presented embodiments.

According to an aspect of an example embodiment, a booting system may include a firmware release server, an electronic device configured to execute a boot loader and first firmware distributed from the firmware release server, the electronic device including at least one processor, a first storage unit configured to store a secret value shared with the firmware release server, a read-only memory (ROM) configured to store a ROM code executable in booting, a second storage unit configured to store the boot loader and the first firmware, where the ROM code, when executed, causes the at least one processor to perform a verification operation on the boot loader based on the secret value and a first endorsement image received from the firmware release server, and where the boot loader is configured to perform a verification operation on the first firmware based on a second endorsement image received from the firmware release server.

According to an aspect of an example embodiment, a booting method of an electronic device may include generating, by executing a ROM code with at least one processor, a first hash value for a boot loader code, generating, by executing the ROM code with the at least one processor, a first device identifier value based on the first hash value and a preset secret value, verifying, by executing the ROM code with the at least one processor, the boot loader code by comparing a first endorsement image received from a firmware release server with the first device identifier value, based on the boot loader code being valid, executing the boot loader code, generating, by executing the boot loader code with the at least one processor, a second hash value for a first firmware code, generating, by executing the boot loader code with the at least one processor, a second device identifier value based on the second hash value and the first device identifier value, verifying, by executing the boot loader code with the at least one processor, the first firmware code by comparing a second endorsement image received from the firmware release server with the second device identifier value, and based on the first firmware code being valid, executing the first firmware code with the at least one processor.

According to an aspect of an example embodiment, a method of distributing firmware may include sharing a preset secret value between a firmware release server and an electronic device, generating a first endorsement image corresponding to a boot loader code and a second endorsement image corresponding to a firmware code, generating an encrypted endorsement image by encrypting a full endorsement image comprising the first endorsement image and the second endorsement image, generating a signed endorsement image by generating a digital signature on the encrypted endorsement image, sending the signed endorsement image from the firmware release server to the electronic device, performing a signature verification operation for the signed endorsement image, based on the digital signature being valid, decrypting the encrypted endorsement image, storing the boot loader code and the first endorsement image in the electronic device as a boot loader, and storing the firmware code and the second endorsement image in the electronic device as firmware.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Figure 1:
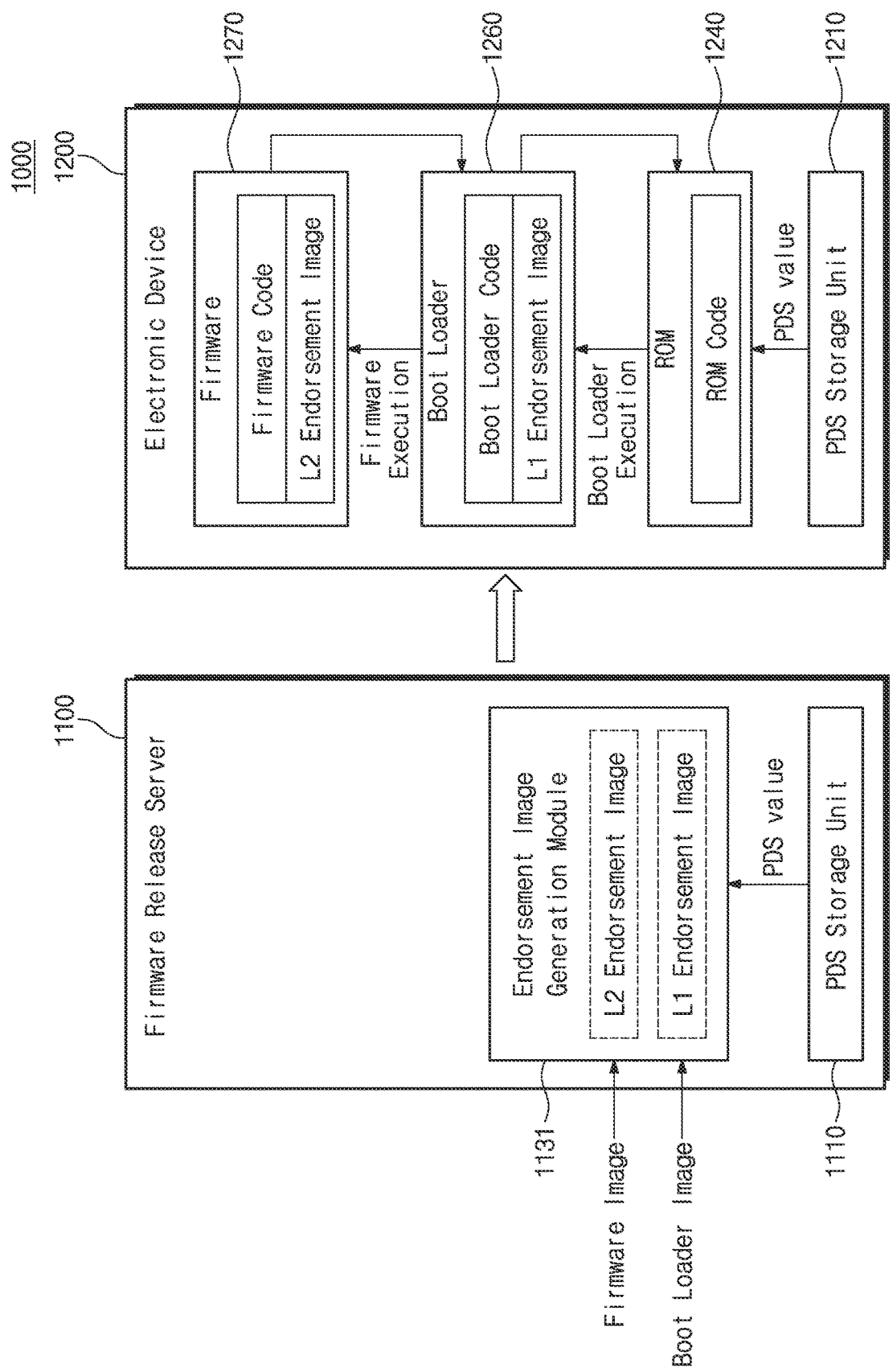
FIG. 1 is a diagram illustrating a secure booting system according to an embodiment of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a diagram illustrating a secure booting system 1000 according to an embodiment of the present disclosure. Referring to FIG. 1, the secure booting system 1000 may include a firmware release server 1100 and an electronic device 1200.

The firmware release server 1100 and the electronic device 1200 may share a pre-installed secret (PDS) value. For example, the firmware release server 1100 may generate the PDS value in advance and may share the PDS value with the electronic device 1200. To prevent the falsification and leakage of the PDS value, the firmware release server 1100 may store the PDS value in a one-time programmable (OTP) memory or an electronic fuse (E-fuse) memory of the electronic device 1200, for example, in the process of manufacturing the electronic device 1200. The PDS value that the firmware release server 1100 generates may change depending on a model of the electronic device 1200, and the electronic devices 1200 of the same model may share the same PDS value.

The firmware release server 1100 may generate a first endorsement image (L1 Endorsement Image) corresponding to a boot loader image and a second endorsement image (L2 Endorsement Image) corresponding to a firmware image, based on the PDS value. The firmware release server 1100 may include a PDS storage unit 1110 and an endorsement image generation module 1131.

The PDS storage unit 1110 may store the PDS value that is generated in advance. The PDS storage unit 1110 may be implemented with an OTP memory or an E-fuse memory for the purpose of safely retaining the PDS value. However, the present disclosure is not limited thereto. For example, the PDS storage unit 1110 may be implemented with a mask read-only memory (ROM), a programmable read-only memory (PROM), an erasable programmable read-only memory (EPROM), an electrically erasable programmable read-only memory (EEPROM), or a flash memory. The PDS value may be variously named a secret value, a unique value, a device unique value, and a unique key.

The endorsement image generation module 1131 may generate the first endorsement image based on the PDS value and the boot loader image. The first endorsement image generated may be stored in the electronic device 1200, and may be used to verify the integrity of a boot loader code before the execution of a boot loader 1260.

The endorsement image generation module 1131 may generate the second endorsement image based on the first endorsement image and the firmware image. The second endorsement image thus generated may be stored in the electronic device 1200, and may be used to verify the integrity of a firmware code before the execution of firmware 1270.

The electronic device 1200 may support a secure booting operation. The secure booting operation may refer to the booting operation to determine whether the boot loader code or the firmware code is falsified and to stop the execution of the boot loader code or the firmware code when it is determined that the boot loader code or the firmware code is abnormal. To this end, the electronic device 1200 may include a PDS storage unit 1210, a ROM 1240, the boot loader 1260, and the firmware 1270.

The PDS storage unit 1210 may store the PDS value that is identical to the PDS value stored in the firmware release server 1100. The PDS storage unit 1210 may be implemented with a one-time programmable (OTP) memory or an E-fuse circuit, but the present disclosure is not limited thereto. For example, the PDS storage unit 1210 may also be implemented with a mask ROM, a PROM, an EPROM, an EEPROM, or a flash memory.

The ROM 1240 may store a ROM code that is first executed by a processor (e.g., the controller 1290) when a power is supplied to the electronic device 1200. The ROM code may include a code that, when executed, causes a processor to verify the boot loader code of the boot loader 1260. For example, the ROM code, when executed, may cause a processor to determine whether the boot loader code is falsified, by generating a first device identifier value based on the PDS value and the boot loader code of the boot loader 1260 and comparing the first device identifier value and the first endorsement image (L1 Endorsement Image). The first endorsement image may be an image that is received from the firmware release server 1100 and is stored in the electronic device 1200.

When the boot loader code is valid, the ROM code, when executed, may cause a processor to execute the boot loader code. When the boot loader code is invalid, the ROM code, when executed, may cause a processor to not execute the boot loader code and notify the user that the booting operation fails.

The boot loader 1260 may include the boot loader code and the first endorsement image. The boot loader code may include a code, when executed, may cause a processor to verify the firmware code of the firmware 1270. For example, the boot loader code, when executed, may cause a processor to determine whether the firmware code is falsified, by generating a second device identifier value based on the first device identifier value and the firmware code of the firmware 1270 and comparing the second device identifier value and the second endorsement image (L2 Endorsement Image). The second endorsement image may be an image that is received from the firmware release server 1100 and is stored in the electronic device 1200.

When the firmware code is valid, the boot loader code, when executed, may cause a processor to execute the firmware code. When the firmware code is invalid, the boot loader code, when executed, may cause a processor to not execute the firmware code and notify the user that the booting operation fails.

As described above, in the secure booting system 1000 according to an embodiment of the present disclosure, the firmware release server 1100 and the electronic device 1200 may share the PDS value. That is, the secure booting system 1000 may support symmetric key-based secure booting, and thus, the booting operation may be quickly performed without a hardware accelerator. Also, in the booting operation, the electronic device 1200 may determine whether the boot loader code and the firmware code are falsified, using the PDS value and the first and second endorsement images. Accordingly, the integrity of the boot loader code and the firmware code may be guaranteed.

Figure 2:
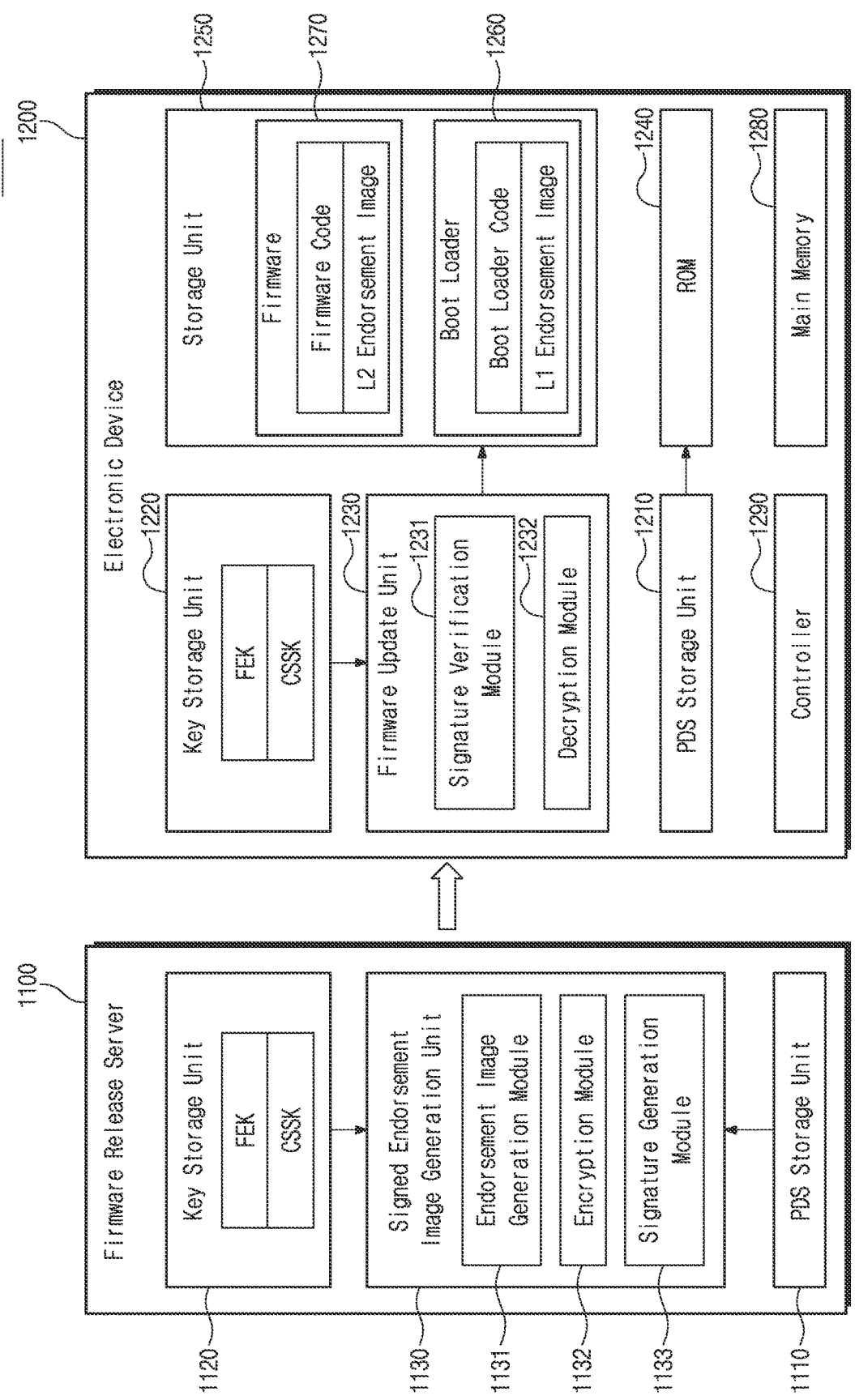
FIG. 2 is a diagram illustrating an example of a secure booting system according to an embodiment of the present disclosure.

FIG. 2 is a diagram illustrating an example of a secure booting system 1000A according to an embodiment of the present disclosure. For convenience of description, an example in which an encryption operation is performed based on an advanced encryption standard (AES) algorithm and a digital signature operation is performed depending on a Rivest-Shamir-Adleman (RSA) algorithm is illustrated in FIG. 2. The secure booting system 1000A of FIG. 2 is similar to the secure booting system 1000 of FIG. 1. Accordingly, the same or similar components may be marked by the same or similar reference numerals/signs, and additional description associated with the same or similar components will be omitted to avoid redundancy.

Referring to FIG. 2, the secure booting system 1000A may include the firmware release server 1100 and the electronic device 1200.

The firmware release server 1100 may generate a full endorsement image using the boot loader image and the firmware image. The firmware release server 1100 may convert the full endorsement image into a signed endorsement image using encryption and a digital signature and may send the signed endorsement image to the electronic device 1200. To this end, the firmware release server 1100 may include the PDS storage unit 1110, a key storage unit 1120, and a signed endorsement image generation unit 1130.

The PDS storage unit 1110 may store the PDS value. The PDS value may be shared by both the firmware release server 1100 and the electronic device 1200 and may be stored therein. The PDS storage unit 1110 may be implemented with an OTP memory, for example.

The key storage unit 1120 may store a key that is used in the encryption and digital signature. For example, when the encryption operation is performed by the AES algorithm, the key storage unit 1120 may store a firmware encryption key (FEK). Also, when the digital signature is performed by the RSA algorithm, the key storage unit 1120 may store a code signing secret key (CSSK). In an embodiment, the key storage unit 1120 may be implemented with an OTP memory, a mask ROM, a PROM, an EPROM, an EEPROM, or a flash memory. In an embodiment, the key storage unit 1120 may be implemented with one storage unit together with the PDS storage unit 1110.

The signed endorsement image generation unit 1130 may generate the full endorsement image using the PDS value and may convert the full endorsement image into the signed endorsement image using the encryption and digital signature technique. The signed endorsement image generation unit 1130 may include the endorsement image generation module 1131, an encryption module 1132, and a signature generation module 1133.

The endorsement image generation module 1131 may receive the PDS value from the PDS storage unit 1110 and may receive the boot loader image and the firmware image from the outside. The endorsement image generation module 1131 may generate the first endorsement image (L1 Endorsement Image) based on the PDS value and the boot loader image. Also, the endorsement image generation module 1131 may generate the second endorsement image (L2 Endorsement Image) based on the first endorsement image and the firmware image. The endorsement image generation module 1131 may generate the full endorsement image by concatenating the first endorsement image and the boot loader image and concatenating the second endorsement image and the firmware image.

The encryption module 1132 may perform the encryption operation on the full endorsement image. For example, the encryption module 1132 may generate an encrypted endorsement image by encrypting the full endorsement image based on a public key-based AES algorithm. In this case, the firmware encryption key FEK may be received from the key storage unit 1120. However, the present disclosure is not limited thereto. For example, any other encryption technique based on the international standard may be applied to the encryption technique according to an embodiment of the present disclosure. A symmetric key-based encryption technique may be used.

The signature generation module 1133 may perform the signature operation on the encrypted endorsement image.

For example, the signature generation module 1133 may generate the signed endorsement image by performing the signature operation on the encrypted endorsement image based on the digital signature algorithm such as a public key-based RSA or elliptic curve digital signature algorithm (ECDSA). In this case, the code signing secret key CSSK necessary for the signature may be received from the key storage unit 1120. However, the present disclosure is not limited thereto. For example, any other signature technique such as ECDSA may be applied to the signature technique according to an embodiment of the present disclosure.

The electronic device 1200 may receive the signed endorsement image from the firmware release server 1100. Through the signature verification operation and the decryption operation for the signed endorsement image, the electronic device 1200 may extract the boot loader image, the first endorsement image corresponding to the boot loader image, the firmware image, and the second endorsement image corresponding to the firmware image. The first and second endorsement images thus extracted may be used when the secure booting operation is performed later. To this end, the electronic device 1200 may include the PDS storage unit 1210, a key storage unit 1220, a firmware update unit 1230, the ROM 1240, a storage unit 1250, a main memory 1280, and a controller 1290.

The PDS storage unit 1210 may store the PDS value that is identical to the PDS value stored in the firmware release server 1100. For example, to prevent the falsification of the PDS value, the PDS value may be stored in the PDS storage unit 1210 in the process of manufacturing the electronic device 1200. The PDS storage unit 1210 may be implemented with an OTP memory or an E-fuse circuit, but the present disclosure is not limited thereto.

The key storage unit 1220 may store a key that is used to verify the decryption and digital signature. For example, when the decryption operation is performed by the AES algorithm, the key storage unit 1220 may store the FEK that is paired with the FEK stored in the firmware release server 1100. Also, when the digital signature is verified by the RSA algorithm, the key storage unit 1220 may store a code signing public key (CSPK) that is paired with the CSSK stored in the firmware release server 1100. In an embodiment, the key storage unit 1220 may be implemented with an OTP memory, a mask ROM, a PROM, an EPROM, an EEPROM, or a flash memory. In an embodiment, the key storage unit 1220 may be implemented with one storage unit together with the PDS storage unit 1210.

The firmware update unit 1230 may perform signature verification and decryption operations on the signed endorsement image received from the firmware release server 1100. To this end, the firmware update unit 1230 may include a signature verification module 1231 and a decryption module 1232.

The signature verification module 1231 may perform the signature verification operation on the signed endorsement image. For example, the signature verification module 1231 may receive the CSPK from the key storage unit 1220 and may perform the signature verification operation using the CSPK. In an embodiment, when the signature verification operation fails, the electronic device 1200 may not download the signed endorsement image or may not store the signed endorsement image in the storage unit 1250. In this case, the electronic device 1200 may notify the firmware release server 1100 that the signature verification operation fails. When the signature verification operation succeeds, a signature portion of the signed endorsement image may be removed and thus may be converted into the encrypted endorsement image.

The decryption module 1232 may perform the decryption operation on the encrypted endorsement image. For example, the decryption module 1232 may receive the FEK from the key storage unit 1220 and may perform the decryption operation using the FEK. After the decryption operation is completed, the boot loader image and the first endorsement image may be stored in the storage unit 1250 as the boot loader 1260, and the firmware image and the second endorsement image may be stored in the storage unit 1250 as the firmware 1270.

The storage unit 1250 may store the boot loader 1260 and the firmware 1270. The storage unit 1250 may implemented with a nonvolatile memory. For example, the storage unit 1250 may implemented with an EEPROM, a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or a memory similar thereto.

The boot loader 1260 may include the boot loader code and the first endorsement image. The boot loader code may include an execution code that, when executed, may cause a processor to execute the boot loader 1260. Also, the boot loader code may include a verification code that, when executed, may cause a processor to verify the firmware code of the firmware 1270. In addition, the boot loader code may further include a code that, when executed, may cause a processor to initialize the boot loader 1260, a code that, when executed, may cause a processor to load the boot loader 1260 to the main memory 1280, etc. The first endorsement image may be used when whether the boot loader code is falsified is determined in the ROM 1240.

The firmware 1270 may include the firmware code and the second endorsement image. The firmware code may include an execution code that, when executed, may cause a processor to execute the firmware 1270, a code that, when executed, may cause a processor to initialize the firmware 1270, a code that, when executed, may cause a processor to load the firmware 1270 to the main memory 1280, etc. The second endorsement image may be used when whether the firmware code is falsified is determined in the boot loader 1260.

The ROM 1240 may store a ROM code that is first executed when a power is supplied to the electronic device 1200. The ROM code may include a code that, when executed, may cause a processor to verify the boot loader code of the boot loader 1260.

In an embodiment of the present disclosure, the ROM code, when executed, may cause a processor to determine whether the boot loader code is falsified, by generating the first device identifier value based on the PDS value of the PDS storage unit 1210 and the boot loader code of the boot loader 1260 and comparing the first device identifier value and the first endorsement image. When the boot loader code is invalid, the boot loader code may not be loaded to the main memory 1280, and the electronic device 1200 may notify the user that the booting operation fails (e.g., may notify the user of the boot fail).

Also, in an embodiment of the present disclosure, the boot loader code, when executed, may cause a processor to determine whether the firmware code is falsified, by generating the second device identifier value based on the first device identifier value and the firmware code of the firmware 1270 and comparing the second device identifier value and the second endorsement image. When the firmware code is invalid, the firmware code may not be loaded to the main memory 1280, and the electronic device 1200 may notify the user that the booting operation fails (e.g., may notify the user of the boot fail).

Continuing to refer to FIG. 2, the main memory 1280 that is a volatile memory may be provided as a working memory of the electronic device 1200. For example, the main memory 1280 may be implemented with a dynamic random access memory (DRAM), a static random access memory (SRAM), a mobile DRAM, or a memory similar thereto. However, the present disclosure is not limited thereto. For example, the main memory 1280 may be implemented with a nonvolatile memory.

The controller 1290 may include at least one processor and may control an overall operation of the electronic device 1200.

As described above, the secure booting system 1000A according to an embodiment of the present disclosure may use the public key-based encryption and signature techniques when performing the encryption and digital signature for the boot loader image and the firmware image. Accordingly, the confidentiality for the boot loader image and the firmware image may be guaranteed. Also, in the secure booting operation, the secure booting system 1000A may determine whether the boot loader code and the firmware code are falsified, using the PDS value and the first and second endorsement images. Accordingly, the fast booting operation may be possible, and the integrity of the boot loader code and the firmware code may also be guaranteed.

Below, a method of the secure booting system 1000A according to an embodiment of the present disclosure will be described in detail under the condition that the firmware update operation and the secure booting operation are distinguished from each other.

[Firmware Distribution Operation]

Figure 3:
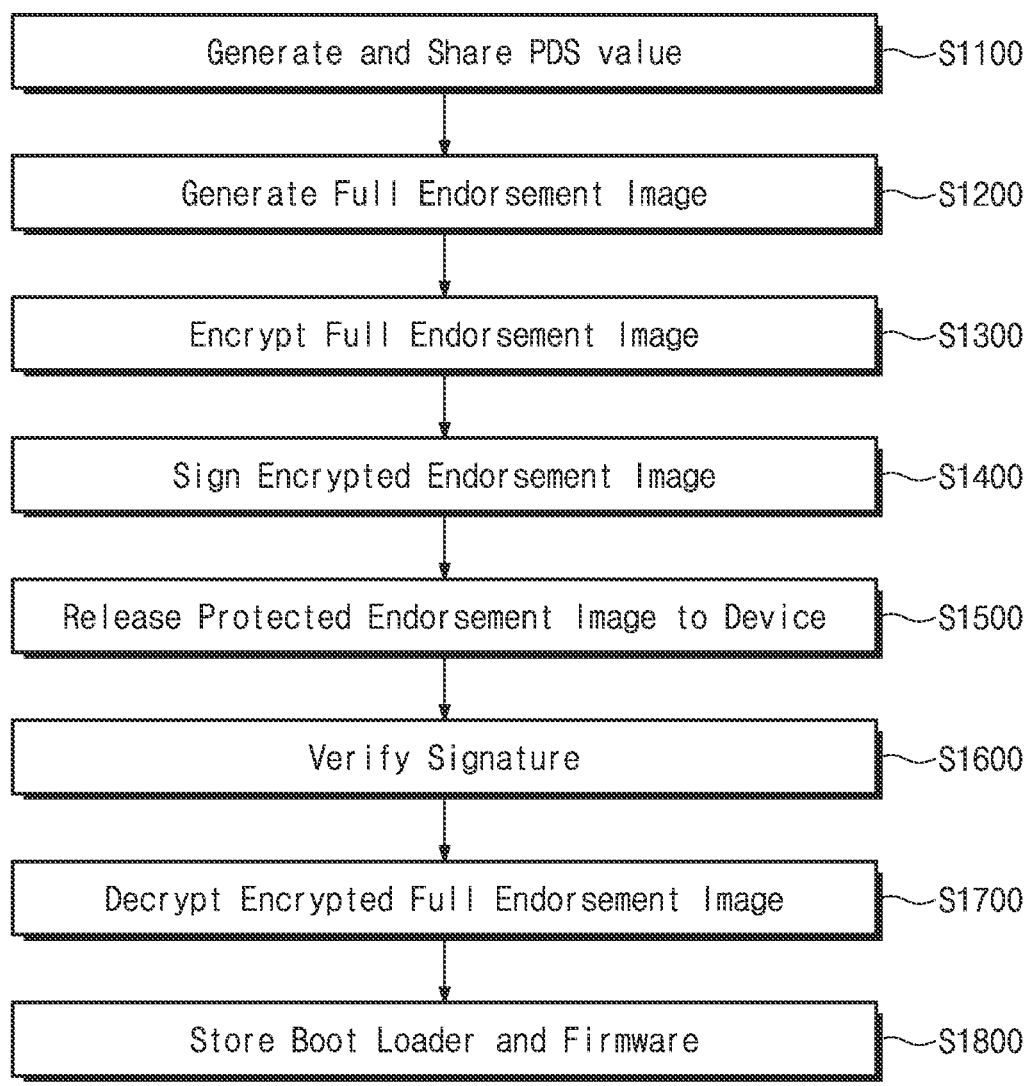
FIG. 3 is a flowchart of a firmware distribution operation of a secure booting system according to an embodiment of the present disclosure.

FIG. 3 is a flowchart of a firmware distribution operation of a secure booting system according to an embodiment of the present disclosure. FIG. 3 is a diagram for describing an overall flow of a firmware distribution operation of the secure booting system 1000A of FIG. 2. The firmware distribution operation according to an embodiment of the present disclosure may maintain the confidentiality through the public key-based encryption and signature techniques.

In operation S1100, the PDS value may be generated and shared by the firmware release server 1100 and the electronic device 1200. For example, the firmware release server 1100 may generate the PDS value and may store the PDS value in an internal OTP memory of the electronic device 1200 in the process of manufacturing the electronic device 1200.

In operation S1200, the firmware release server 1100 may generate the full endorsement image. For example, the full endorsement image may include the boot loader image, the first endorsement image corresponding to the boot loader image, the firmware image, and the second endorsement image corresponding to the firmware image.

In operation S1300, the firmware release server 1100 may encrypt (e.g., perform the encryption operation) on the full endorsement image. In this case, the encryption operation may be performed using the public key-based encryption technique such as an AES algorithm, and the full endorsement image on which the encryption operation is completed may be referred to as an "encrypted endorsement image".

In operation S1400, the firmware release server 1100 may sign the encrypted endorsement image (e.g., may perform the digital signature operation on the encrypted endorsement image). In this case, the digital signature operation may be performed using the public key-based signature technique such as RSA or ECDSA algorithm, and the encrypted endorsement image on which the signature is completed may be referred to as a "signed endorsement image".

In operation S1500, the firmware release server 1100 may release (e.g., distribute) the signed endorsement image to the electronic device 1200.

In operation S1600, the electronic device 1200 may verify the signature (e.g., perform the signature verification operation) on the signed endorsement image. When the signature verification operation fails, the electronic device 1200 may notify the firmware release server 1100 that the signature verification operation fails.

In operation S1700, the electronic device 1200 may decrypt the encrypted full endorsement image (e.g., may perform the decryption operation on the encrypted endorsement image). As such, the encrypted endorsement image may be converted into the boot loader image, the first endorsement image, the firmware image, and the second endorsement image.

In operation S1800, the electronic device 1200 may store the boot loader and the firmware. That is, the electronic device 1200 may store the boot loader image, the first endorsement image, the firmware image, and the second endorsement image in the storage unit 1250.

Through the above firmware distribution operation, the boot loader image and the firmware image may be safely transferred from the firmware release server 1100 to the electronic device 1200. Afterwards, the electronic device 1200 may perform the secure booting operation based on the PDS value and the first and second endorsement images.

Figure 4:
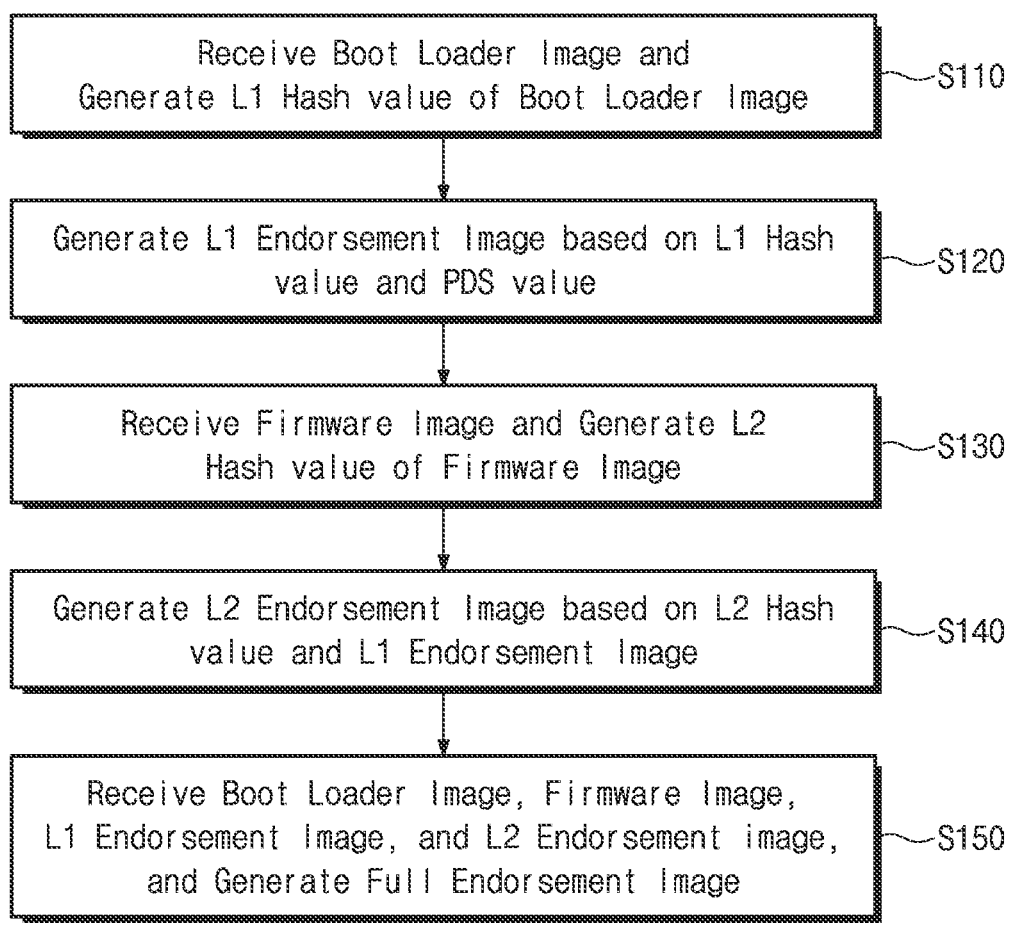
FIG. 4 is a flowchart illustrating an operation of an endorsement image generation module according to an embodiment of the present disclosure.
Figure 5:
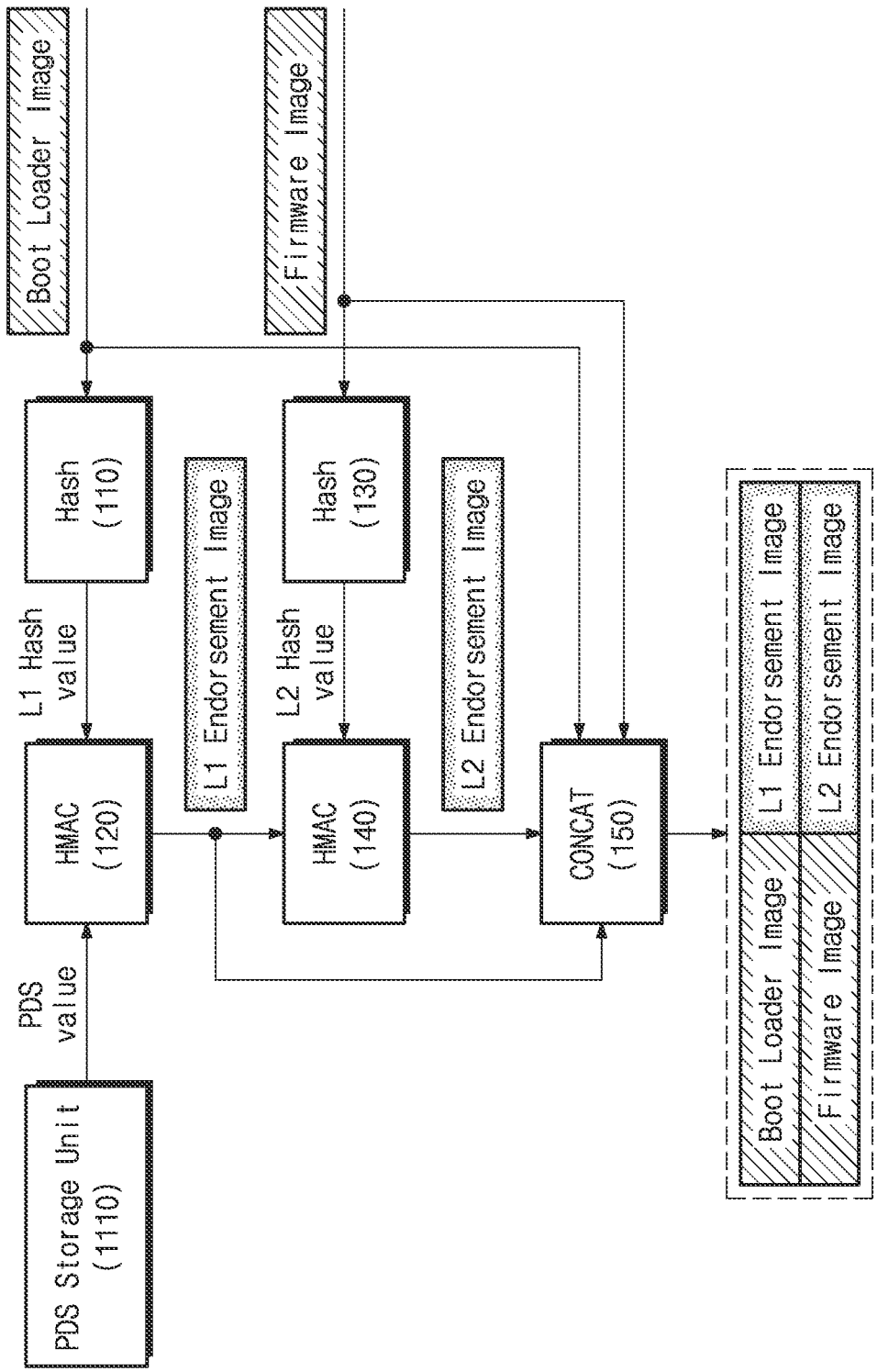
FIG. 5 is a diagram illustrating an example in which a full endorsement image is generated by an endorsement image generation module according to an embodiment of the present disclosure.

FIG. 4 is a flowchart illustrating an operation of an endorsement image generation module according to an embodiment of the present disclosure. FIG. 5 is a diagram illustrating an example in which a full endorsement image is generated by an endorsement image generation module according to an embodiment of the present disclosure. FIGS. 4 and 5 are diagrams for describing an operation of the endorsement image generation module 1131 of FIG. 2 in detail. FIG. 4 is a flowchart illustrating an operation of the endorsement image generation module 1131 of FIG. 2, and FIG. 5 is a diagram illustrating an example in which the full endorsement image is generated by the endorsement image generation module 1131 of FIG. 2. For convenience of description, in FIGS. 4 and 5, it is assumed that the endorsement image generation module 1131 operates based on a hash-based message authentication code (HMAC) algorithm.

Referring to FIGS. 4 and 5, in operation S110, a hash algorithm 110 may receive the boot loader image and may generate a first hash value (L1 Hash value) corresponding to the boot loader image.

In operation S120, an HMAC algorithm 120 may generate the first endorsement image (L1 Endorsement image) based on the PDS value received from the PDS storage unit 1110 and the first hash value (L1 Hash value) output from the hash algorithm 110. That is, the HMAC algorithm 120 may output the first endorsement image as the HMAC value using the PDS value as an input key of an HMAC function and using the first hash value as input data of the HMAC function.

In operation S130, a hash algorithm 130 may receive the firmware image and may generate a second hash value (L2 Hash value) corresponding to the firmware image.

In operation S140, an HMAC algorithm 140 may generate the second endorsement image (L2 Endorsement image)

based on the first endorsement image received from the HMAC algorithm 120 and the second hash value (L2 Hash value) output from the hash algorithm 130.

In operation S150, a CONCAT (i.e., concatenation) algorithm 150 may receive the boot loader image, the firmware image, the first endorsement image, and the second endorsement image, and may generate the full endorsement image by concatenating the first endorsement image and the boot loader image and concatenating the second endorsement image and the firmware image.

In FIGS. 4 and 5, the HMAC algorithms 120 and 140 may be substantially the same algorithm, and the hash algorithms 110 and 130 may be substantially the same algorithm. Also, instead of the HMAC algorithm, there may be used a message authentication code based on universal hashing (UMAC) algorithm, a cipher-based message authentication code (CMAC) algorithm, a block cipher-based message authentication code (VMAC) algorithm using a universal hash, or an algorithm similar thereto.

Figure 6:
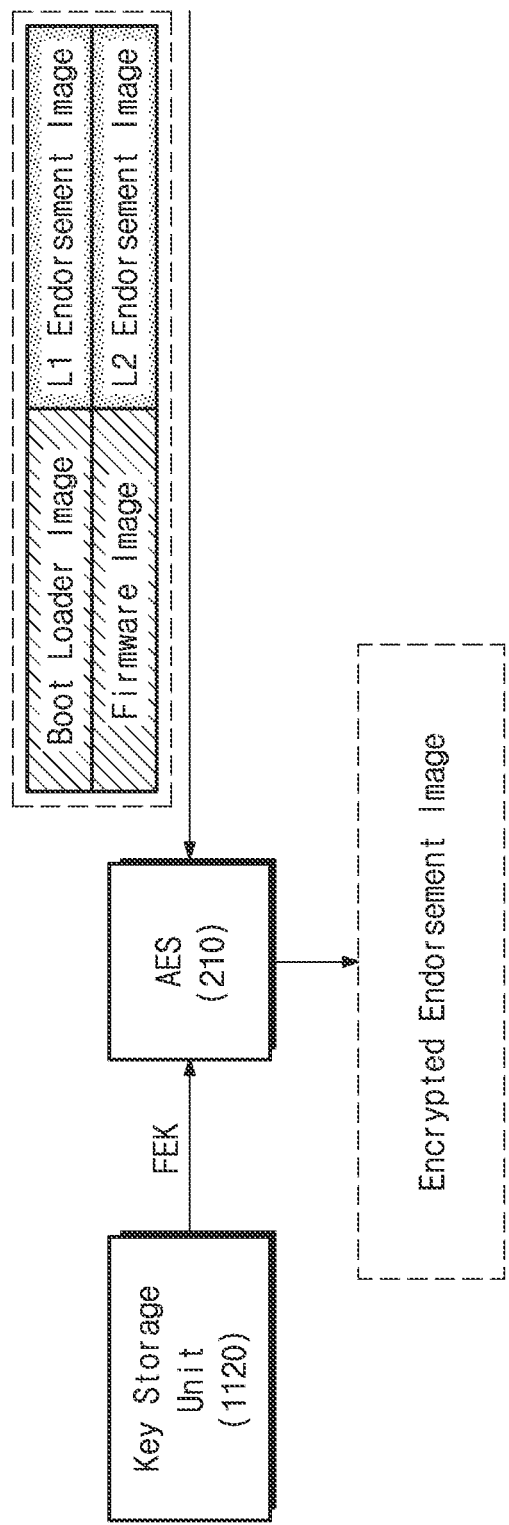
FIG. 6 is a diagram illustrating an example of an operation of an encryption module according to an embodiment of the present disclosure.

FIG. 6 is a diagram illustrating an example of an operation of an encryption module according to an embodiment of the present disclosure. FIG. 6 is a diagram illustrating an example of an operation of the encryption module 1132 of FIG. 2. For convenience of description, in FIG. 6, it is assumed that the encryption module 1132 performs the encryption operation based on the public key-based AES algorithm.

Referring to FIG. 6, an AES algorithm 210 may receive the firmware encryption key FEK from the key storage unit 1120 and may receive the full endorsement image from the endorsement image generation module 1131. The AES algorithm 210 may encrypt the full endorsement image to generate the encrypted endorsement image.

Figure 7:
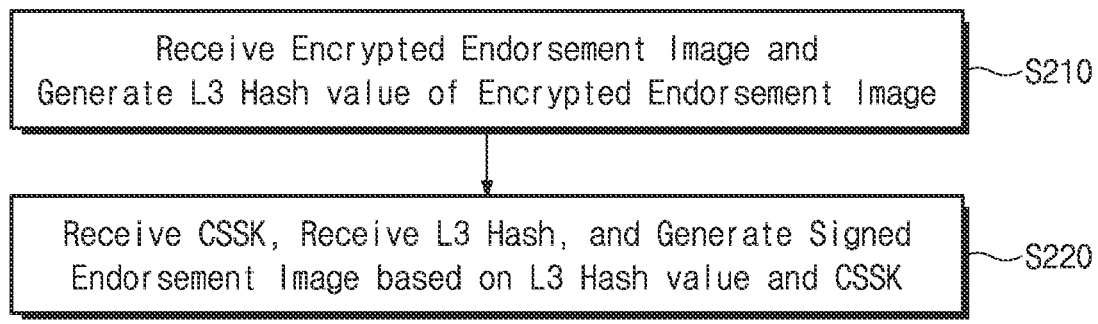
FIG. 7 is a flowchart illustrating an operation of a signature generation module according to an embodiment of the present disclosure.
Figure 8:
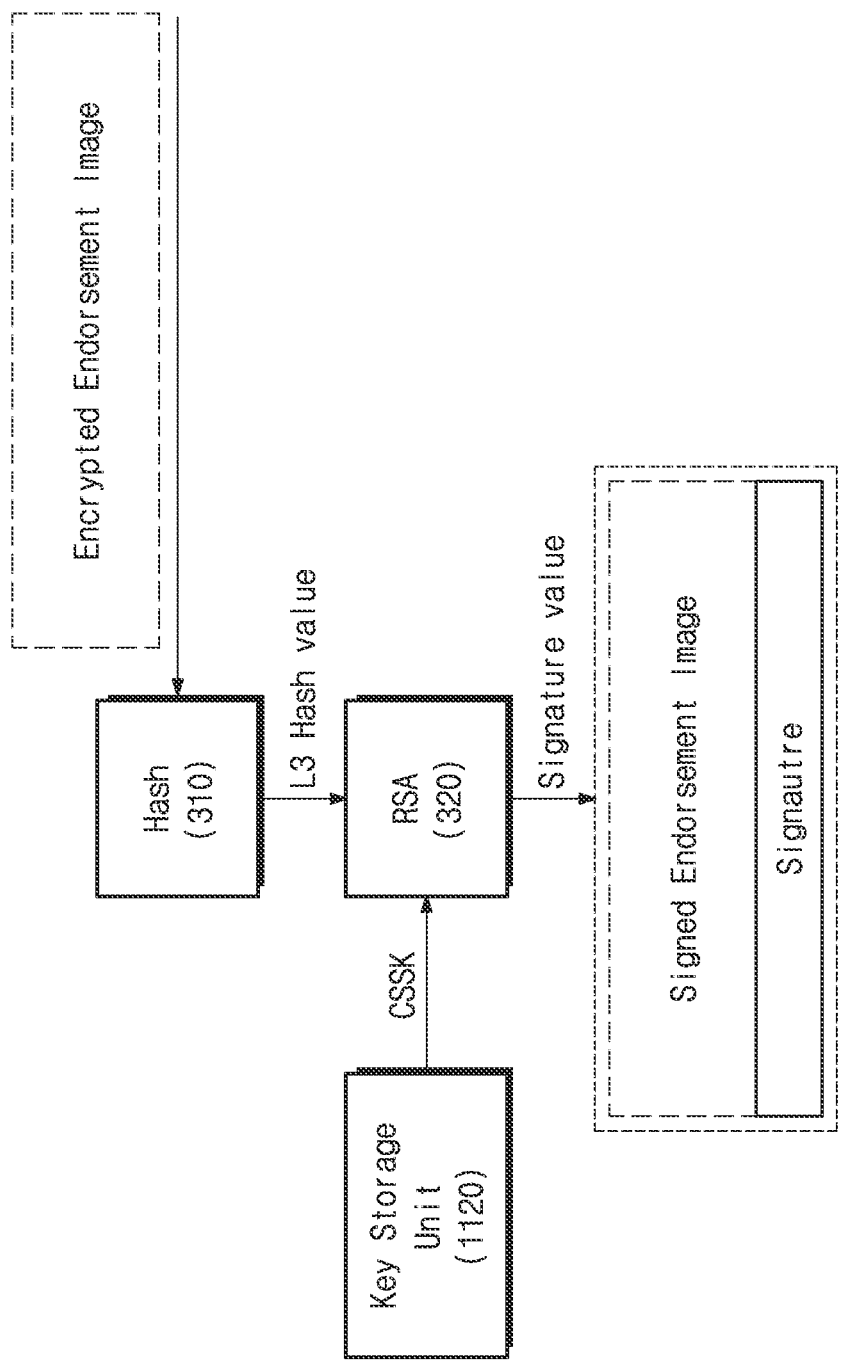
FIG. 8 is a diagram illustrating an example in which a signed endorsement image is generated by a signature generation module according to an embodiment of the present disclosure.

FIG. 7 is a flowchart illustrating an operation of a signature generation module of according to an embodiment of the present disclosure. FIG. 8 is a diagram illustrating an example in which a signed endorsement image is generated by a signature generation module according to an embodiment of the present disclosure. FIGS. 7 and 8 are diagrams for describing an operation of the signature generation module 1133 of FIG. 2 in detail. In detail, FIG. 7 is a flowchart illustrating an operation of the signature generation module 1133 of FIG. 2, and FIG. 8 is a diagram illustrating an example in which the signed endorsement image is generated by the signature generation module 1133 of FIG. 2. For convenience of description, in FIGS. 7 and 8, it is assumed that the signature generation module 1133 operates based on a public key-based RSA algorithm.

Referring to FIGS. 7 and 8, in operation S210, a hash algorithm 310 may receive the encrypted endorsement image and may generate a third hash value (L3 Hash value) corresponding to the encrypted endorsement image.

In operation S220, an RSA algorithm 320 may receive the CSSK from the key storage unit 1120 and may receive the third hash value from the hash algorithm 310, and the RSA algorithm 320 may generate the signed endorsement image by performing the digital signature operation using the CSSK.

In FIGS. 7 and 8, an ECDSA algorithm, an Edwards-curve digital secure algorithm (EdDSA) algorithm, or an algorithm similar thereto may be used instead of the RSA algorithm.

Figure 9:
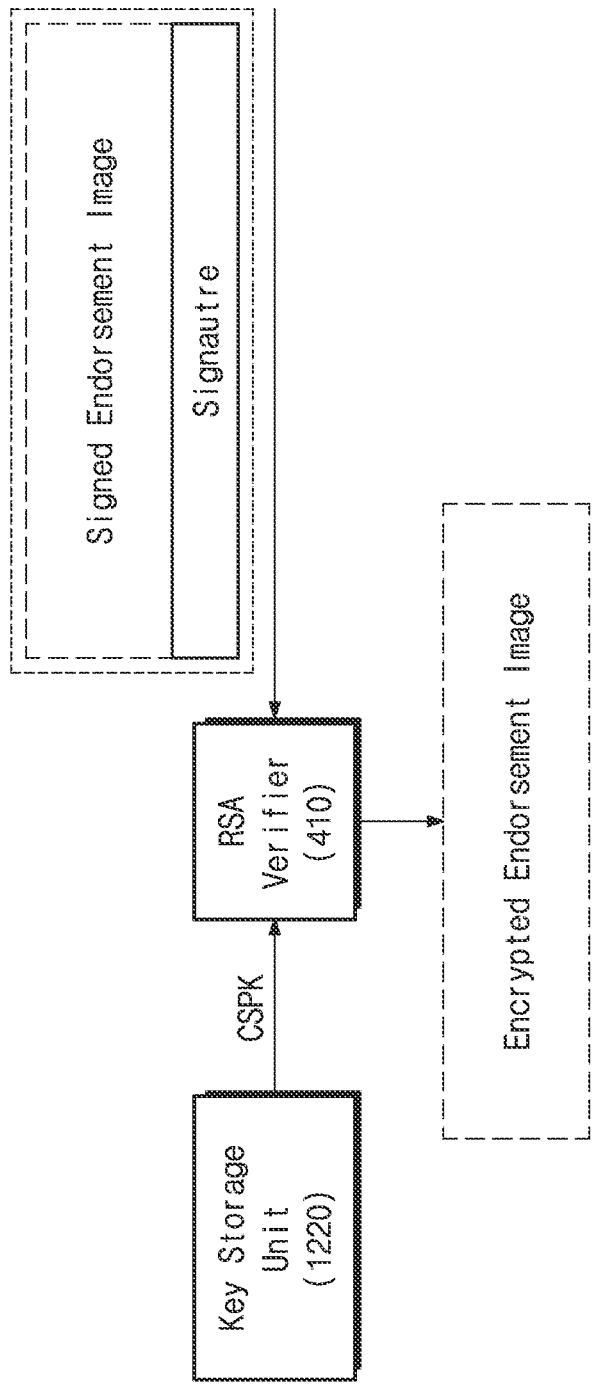
FIG. 9 is a diagram illustrating an example of an operation of a signature verification module according to an embodiment of the present disclosure.

FIG. 9 is a diagram illustrating an example of an operation of a signature verification module according to an embodiment of the present disclosure. FIG. 9 is a diagram illustrating an example of an operation of the signature verification module 1231 of FIG. 2. For convenience of description, similar to FIG. 7, it is assumed that the signature verification operation is performed based on the public key-based RSA algorithm.

Referring to FIG. 9, an RSA verification algorithm 410 may receive the CSPK from the key storage unit 1220 and may receive the signed endorsement image from the firmware release server 1100. The RSA verification algorithm 410 may perform the signature verification operation on the signed endorsement image using the CSPK. When the signature verification operation fails, the electronic device 1200 may notify the firmware release server 1100 that the signature verification operation fails.

Figure 10:
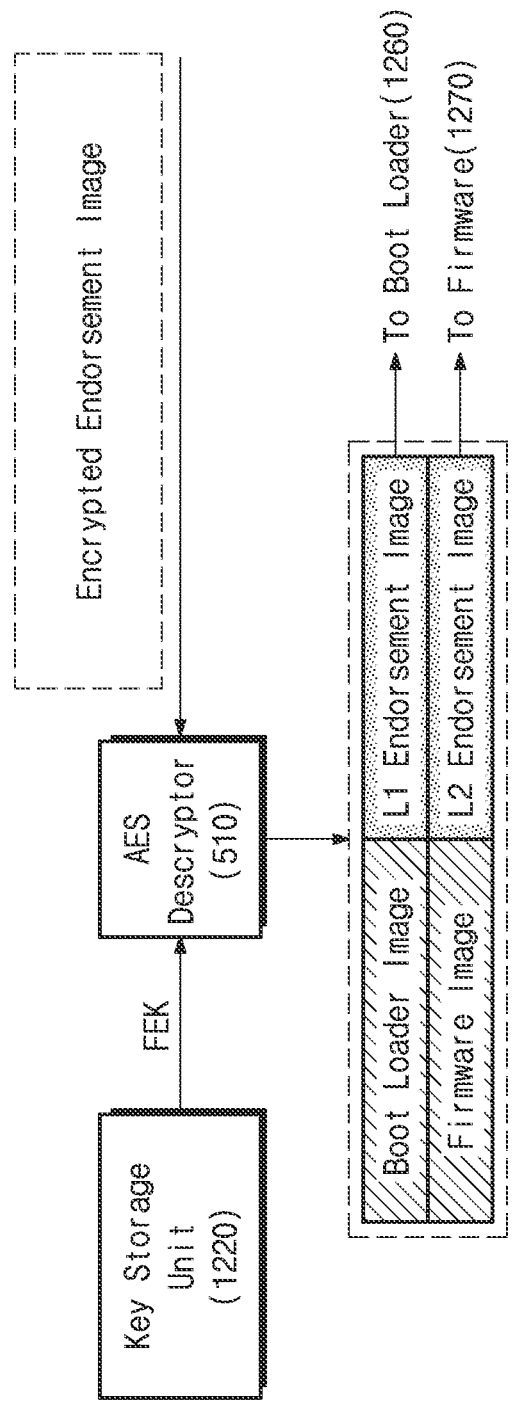
FIG. 10 is a diagram illustrating an example of an operation of a decryption module according to an embodiment of the present disclosure.

FIG. 10 is a diagram illustrating an example of an operation of a decryption module according to an embodiment of the present disclosure. FIG. 10 is a diagram illustrating an example of an operation of the decryption module 1232 of FIG. 2. For convenience of description, similar to FIG. 6, it is assumed that the decryption operation is performed based on the public key-based AES algorithm.

Referring to FIG. 10, an AES decryption algorithm 510 may receive the FEK from the key storage unit 1220 and may receive the encrypted endorsement image from the signature verification module 1231. The AES decryption algorithm 510 may decrypt the encrypted endorsement image to output the full endorsement image.

The boot loader image and the first endorsement image, which are concatenated, from among the full endorsement image may be stored in the storage unit 1250 as the boot loader 1260, and the firmware image and the second endorsement image, which are concatenated, from among the full endorsement image may be stored in the storage unit 1250 as the firmware 1270.

[Secure Booting Operation]

Figure 11:
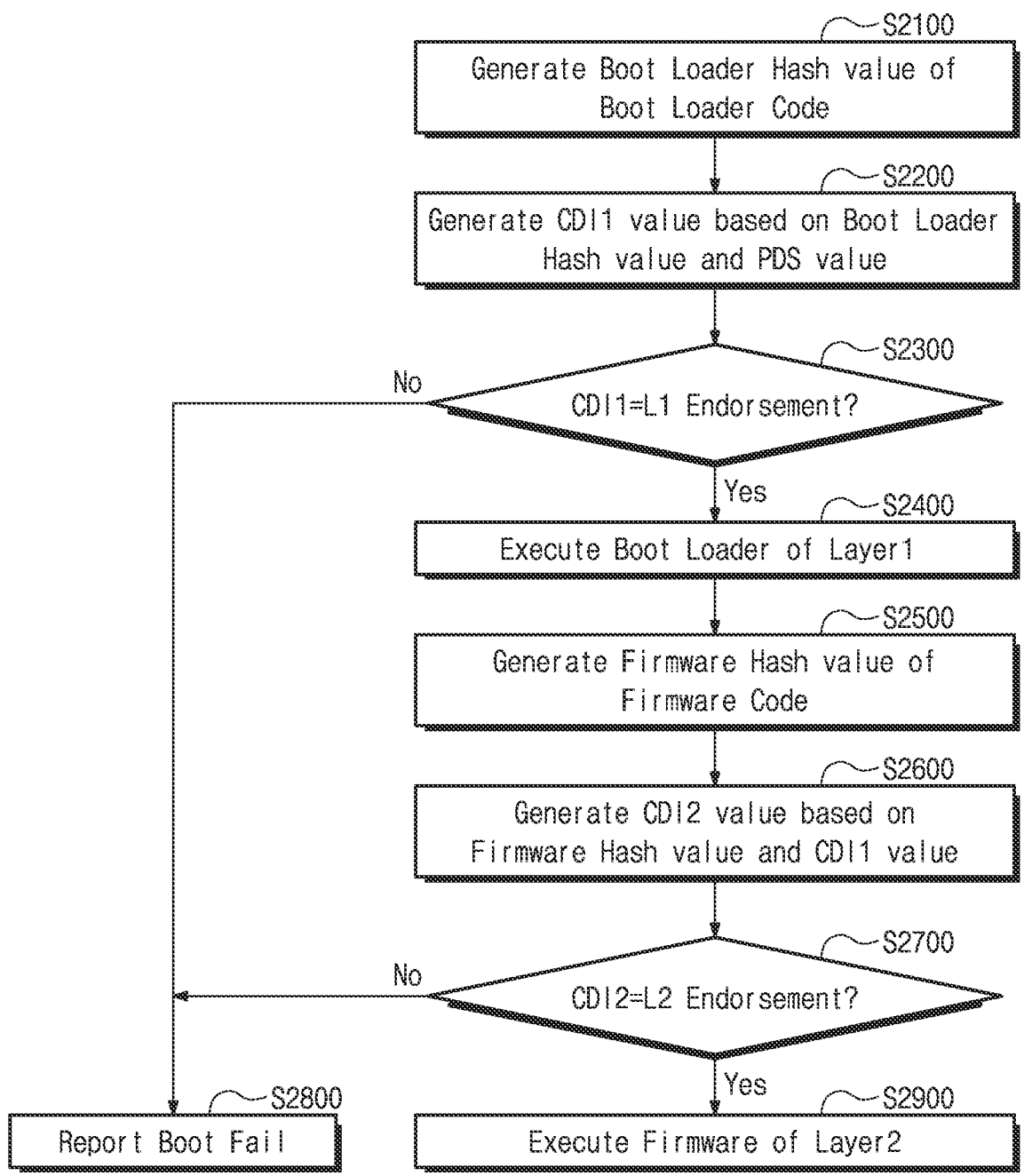
FIG. 11 is a flowchart illustrating an example of a secure booting operation of an electronic device according to an embodiment of the present disclosure.
Figure 12:
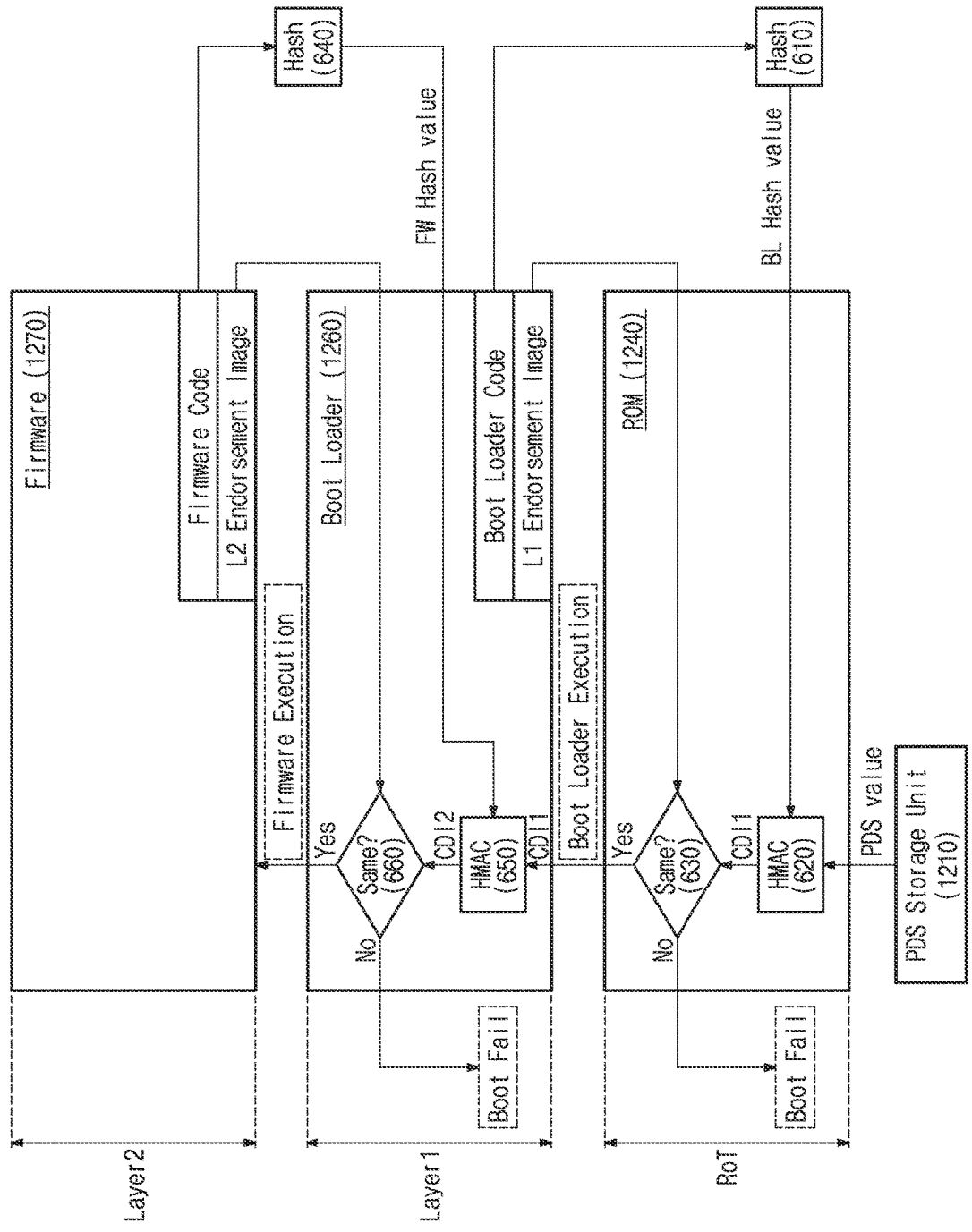
FIG. 12 is a diagram illustrating an example in which a secure booting operation is performed by a symmetric key-based hash-based message authentication code (HMAC) algorithm according to an embodiment of the present disclosure.

FIG. 11 is a flowchart illustrating an example of a secure booting operation of an electronic device according to an embodiment of the present disclosure. FIG. 12 is a diagram illustrating an example in which a secure booting operation is performed by a symmetric key-based HMAC algorithm according to an embodiment of the present disclosure. FIGS. 11 and 12 are diagrams for describing a secure booting operation of the electronic device 1200 of FIG. 2 in detail. In detail, FIG. 11 is a flowchart illustrating an example of the secure booting operation of the electronic device 1200 of FIG. 2, and FIG. 12 is a diagram illustrating an example where the secure booting operation is performed by a symmetric key-based HMAC algorithm. In FIGS. 11 and 12, the ROM 1240, the boot loader 1260, and the firmware 1270 may constitute a layer structure of a root of trust (RoT), a first layer (Layer1), and a second layer (Layer2).

Referring to FIGS. 11 and 12, in operation S2100, a hash algorithm 610 stored in the ROM 1240 may generate a boot loader hash value corresponding to the boot loader code of the boot loader 1260. In operation S2100, the RoT, that is, the ROM code, may be executed by a processor (e.g., the controller 1290).

In operation S2200, an HMAC algorithm 620 included in the ROM 1240 may generate a first device identifier value CDI1 based on the PDS value received from the PDS storage unit 1210 and the boot loader hash value output from the hash algorithm 610.

In operation S2300, a comparison algorithm 630 stored in the ROM 1240 may determine whether the boot loader code of the boot loader 1260 is falsified, by comparing the first device identifier value CDI1 and the first endorsement image. The comparison algorithm 630 stored in the ROM 1240 may receive the first device identifier value CDI1 from the HMAC algorithm 620 and may receive the first endorsement image from the boot loader 1260 being the first layer.

When the first device identifier value CDI1 and the first endorsement image are different, the electronic device 1200 may notify the user that the booting operation fails in operation S2800. In this case, the boot loader 1260 and the firmware 1270 stored in the storage unit 1250 may not be loaded to the main memory 1280 or may not be executed.

When the first device identifier value CDI1 and the first endorsement image coincide with each other, the boot loader 1260 may be loaded to the main memory 1280 and may be executed, in operation S2400.

In operation S2500, a hash algorithm 640 stored in the boot loader 1260 being the first layer may generate a firmware hash value corresponding to the firmware code of the firmware 1270.

In operation S2600, an HMAC algorithm 650 included in the boot loader 1260 may generate a second device identifier value CDI2 based on the first device identifier value CDI1 received from the ROM 1240 and the firmware hash value output from the hash algorithm 640.

In operation S2700, a comparison algorithm 660 stored in the boot loader 1260 may determine whether the firmware code of the firmware 1270 is falsified, by comparing the second device identifier value CDI2 and the second endorsement image. The comparison algorithm 660 stored in the boot loader 1260 may receive the second device identifier value CDI2 from the HMAC algorithm 650 and may receive the second endorsement image from the firmware 1270 being the second layer. The comparison algorithm 660 may determine whether the firmware code of the firmware 1270 is falsified, by comparing the second device identifier value CDI2 and the second endorsement image.

When the second device identifier value CDI2 and the second endorsement image are different, the electronic device 1200 may notify the user that the booting operation fails in operation S2800. In this case, the firmware 1270 stored in the storage unit 1250 may not be loaded to the main memory 1280 or may not be executed.

When the second device identifier value CDI2 and the second endorsement image coincide with each other, the firmware 1270 may be loaded to the main memory 1280 and may be executed in operation S2900.

As described above, the secure booting system 1000A according to an embodiment of the present disclosure may operate based on the public key-based encryption and signature techniques when distributing the firmware and may operate based on the symmetric key-based secure booting technique in the booting operation. In particular, in the booting operation, whether the firmware is falsified may be determined by sequentially checking the falsification of the boot loader code and the firmware code thoroughly using the PDS value and the first and second endorsement images.

The above description is provided as an example, and the present disclosure is not limited thereto. Below, various modified examples of the present disclosure will be described in detail.

Figure 13:
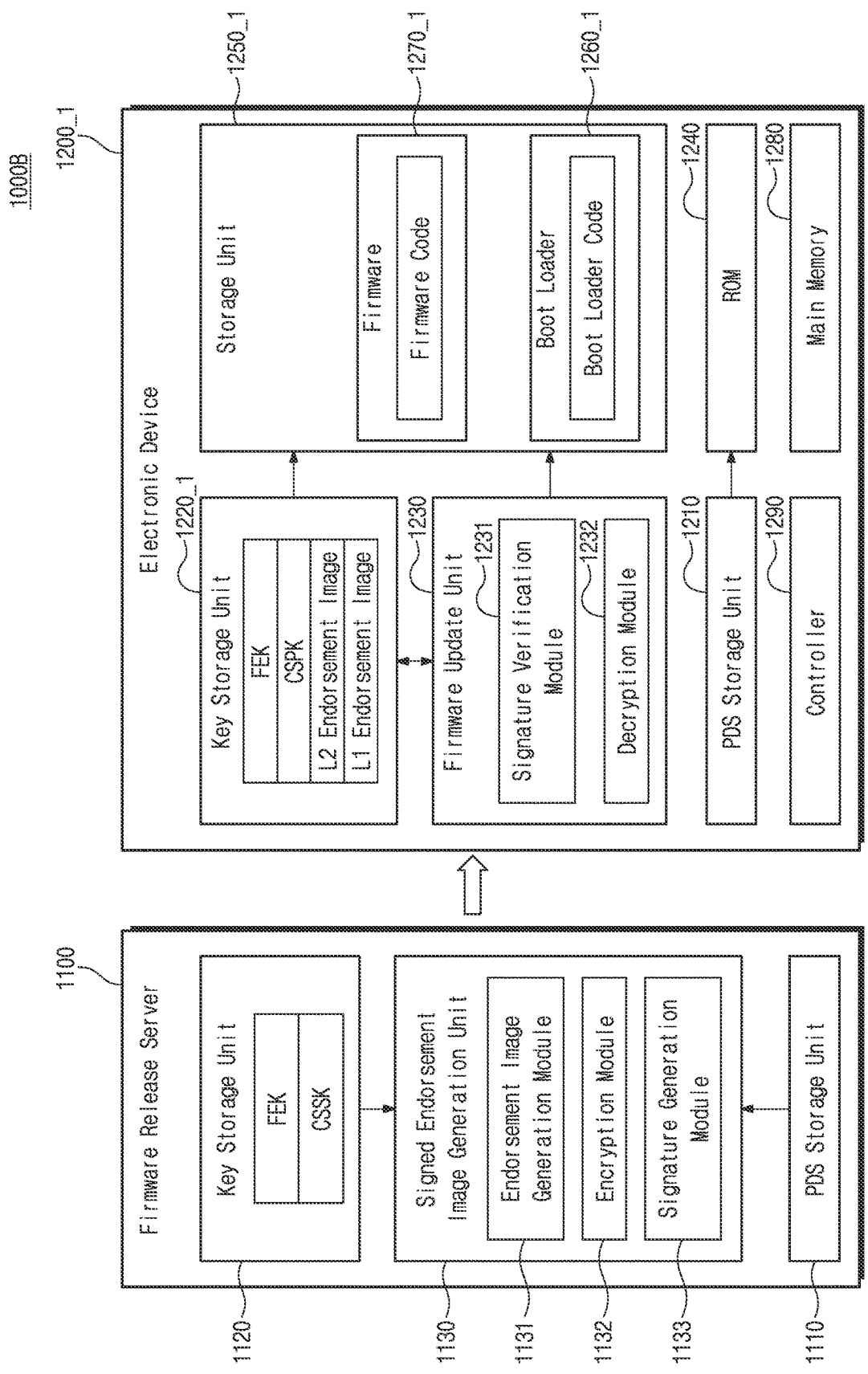
FIG. 13 is a diagram illustrating an example of a secure booting system according to an embodiment of the present disclosure.
Figure 14:
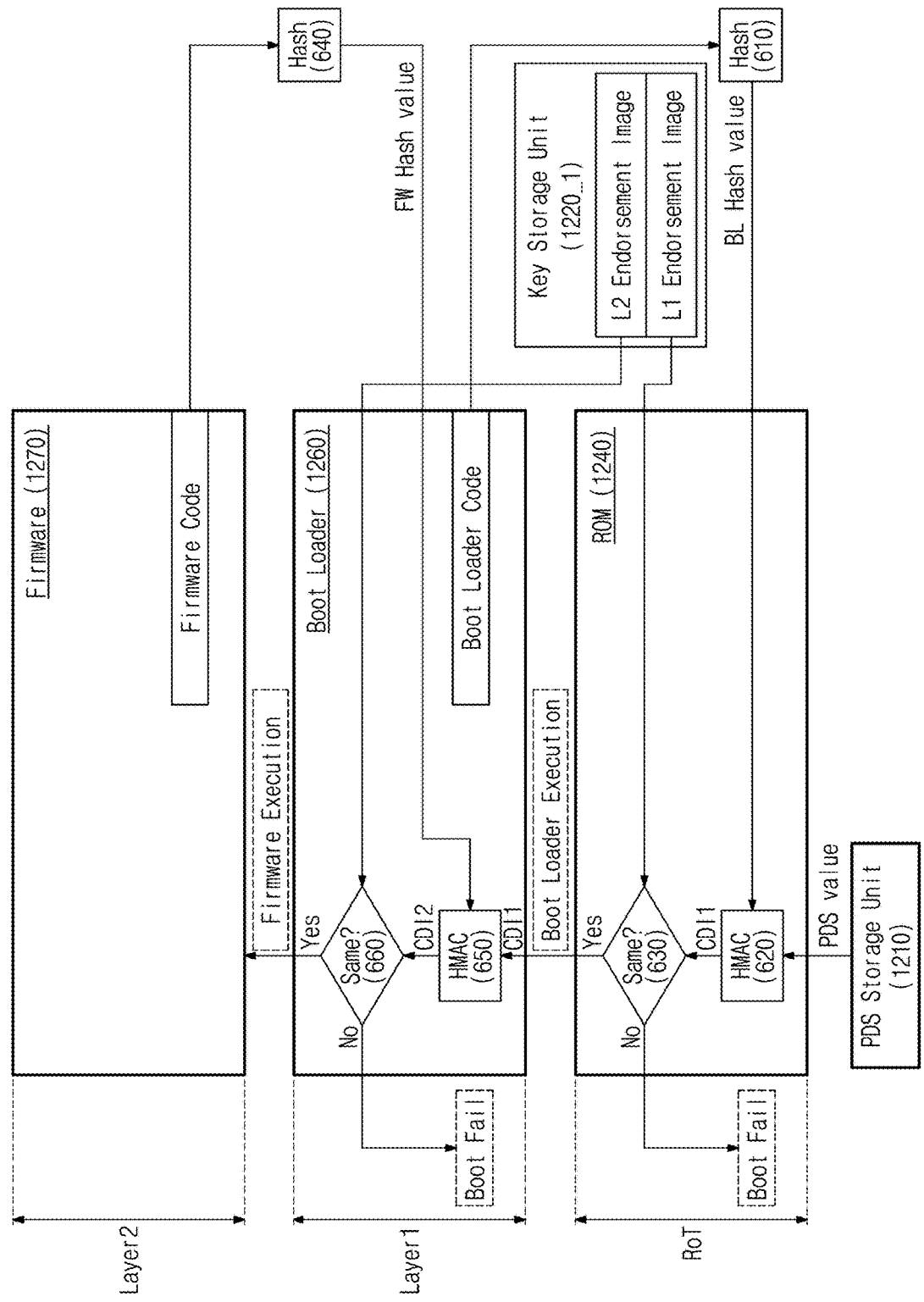
FIG. 14 is a diagram illustrating an example of a secure booting operation of a secure booting system according to an embodiment of the present disclosure.

FIG. 13 is a block diagram illustrating an example of a secure booting system 1000B according to an embodiment of the present disclosure. FIG. 14 is a diagram illustrating an example of a secure booting operation of a secure booting system according to an embodiment of the present disclosure. That is, FIG. 14 is a diagram illustrating an example of the secure booting operation of the secure booting system 1000B of FIG. 13. The secure booting system 1000B of FIG. 13 is similar to the secure booting system 1000A of FIG. 2, and the secure booting operation of FIG. 14 is similar to the secure booting operation of FIG. 12. Accordingly, the same or similar components may be marked by the same or similar reference numerals/signs, and additional description associated with the same or similar components will be omitted to avoid redundancy.

Unlike the secure booting system 1000A of FIG. 2, in the secure booting system 1000B of FIG. 13, the first endorsement image (L1 Endorsement Image) may not be concatenated with the boot loader image, and the second endorsement image (L2 Endorsement Image) may not be concatenated with the second endorsement image. The first endorsement image and the second endorsement image may be stored in a separate storage space.

In an embodiment, as illustrated in FIG. 13, the first endorsement image and the second endorsement image may be stored in a key storage unit 1220_1 together with the FEK and the CSPK.

In this case, as illustrated in FIG. 14, in the secure booting operation, the comparison algorithm 630 stored in the ROM 1240 may receive the first endorsement image from the key storage unit 1220_1 and may determine whether the first endorsement image and the first device identifier value coincide with each other. Also, the comparison algorithm 660 stored in the boot loader 1260 may receive the second endorsement image from the key storage unit 1220_1 and may determine whether the second endorsement image and the second device identifier value coincide with each other.

In another embodiment, the first endorsement image and the second endorsement image may be independently stored in a secure area, which is separately provided, such as an OTP memory.

Figure 15:
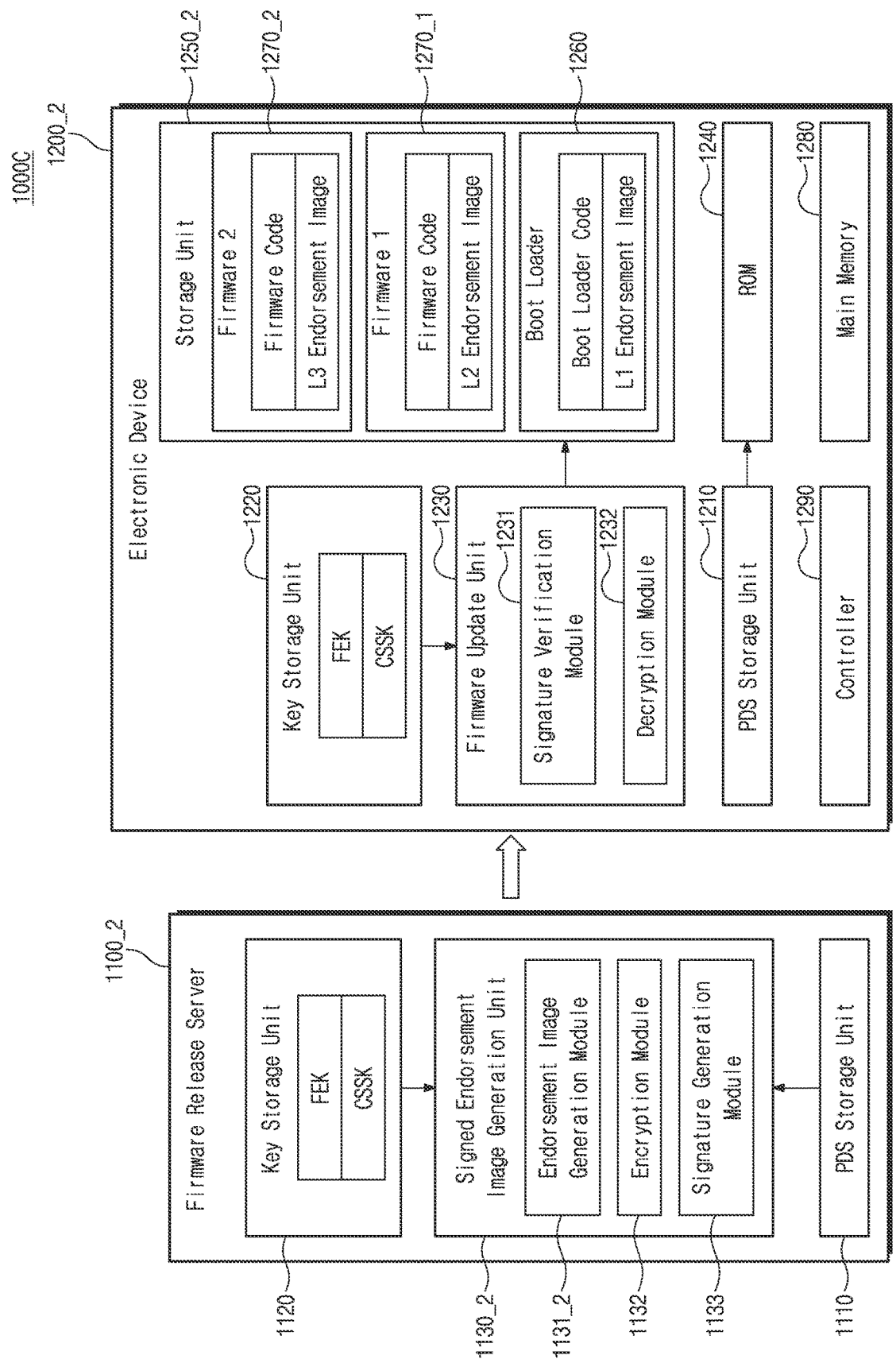
FIG. 15 is a diagram illustrating an example of a secure booting system according to an embodiment of the present disclosure.
Figure 16:
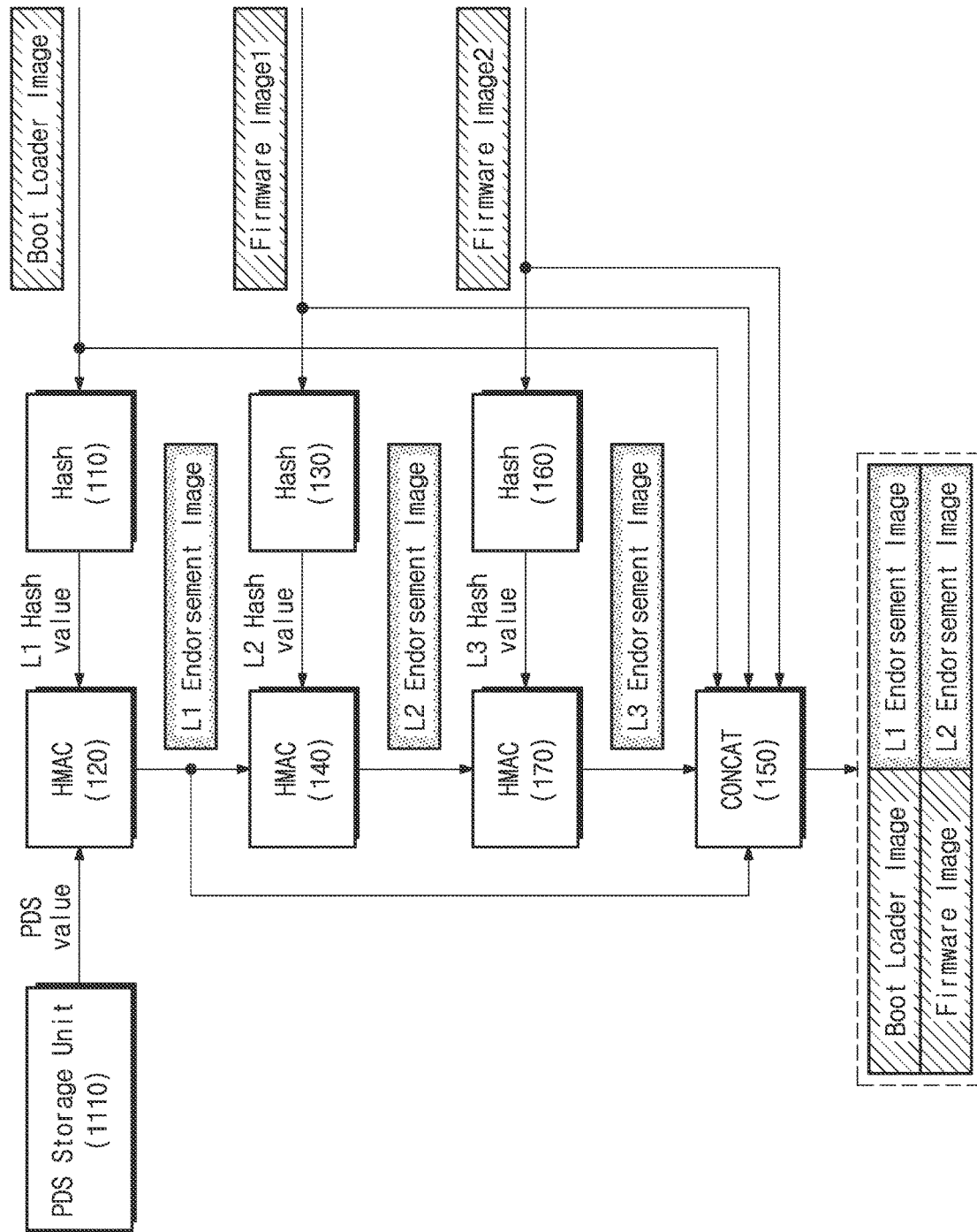
FIG. 16 is a diagram illustrating an example of an operation of an endorsement image generation module of a secure booting system according to an embodiment of the present disclosure.
Figure 17:
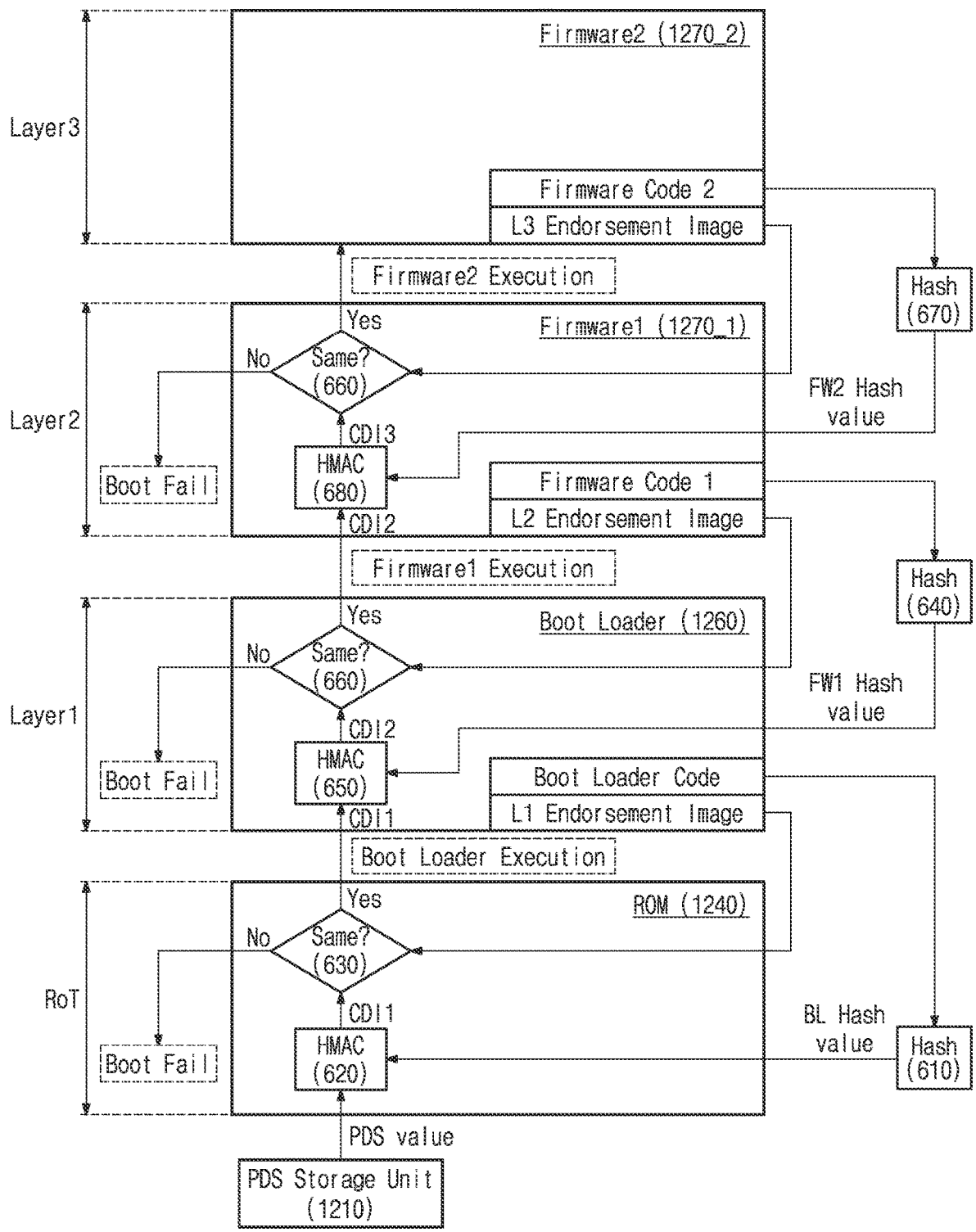
FIG. 17 is a diagram illustrating an example of a secure booting operation of a secure booting system according to an embodiment of the present disclosure.

FIG. 15 is a block diagram illustrating an example of a secure booting system 1000C according to an embodiment the present disclosure. FIG. 16 is a diagram illustrating an example of an operation of an endorsement image generation module of a secure booting system according to an embodiment of the present disclosure. That is, FIG. 16 is a diagram illustrating an example of an operation of an endorsement image generation module 1131_2 of the secure booting system 1000C of FIG. 15 FIG. 17 is a diagram illustrating an example of the secure booting operation of the secure booting system 1000C according to an embodiment of the disclosure. A configuration and an operation of the secure booting system 1000C of FIG. 15 are similar to those of the secure booting system 1000A of FIG. 2. Accordingly, the same or similar components may be marked by the same or similar reference numerals/signs, and additional description associated with the same or similar components will be omitted to avoid redundancy.

Referring to FIG. 15, the secure booting system 1000C may include a plurality of firmware, and each of the plurality of firmware may form a layer structure for the secure booting operation. For example, it is assumed that the secure booting system 1000C includes first firmware 1270_1 and second firmware 12702. In this case, the ROM 1240, the boot loader 1260, the first firmware 1270_1, and the second firmware 1270_2 may constitute a layer structure of a RoT, a first layer (Layer1), a second layer (Layer2), and a third layer (Layer3). Accordingly, in the secure booting operation, the ROM 1240 may determine whether the boot loader 1260 being a next layer is falsified, the boot loader 1260 may determine whether the first firmware 1270_1 being a next layer is falsified, and the first firmware 1270_1 may determine whether the second firmware 1270_2 being a next layer is falsified. As such, whether the plurality of firmware are falsified may be determined more thoroughly.

The description will be given with reference to FIG. 16 in detail. When generating the endorsement image, the endorsement image generation module 1131_2 of the firmware release server 1100_2 may generate first to third endorsement images.

For example, the HMAC algorithm 120 may generate the first endorsement image (L1 Endorsement Image) corresponding to the boot loader image based on the PDS value and a first hash value (L1 Hash Value). The HMAC algorithm 140 may generate the second endorsement image (L2 Endorsement Image) corresponding to the first firmware image (Firmware Image1) based on the first endorsement image and a second hash value (L2 Hash Value). The HMAC algorithm 170 may generate the third endorsement image (L3 Endorsement Image) corresponding to the second firmware image (Firmware Image2) based on the second endorsement image and a third hash value (L3 Hash Value).

The description will be given with reference to FIG. 17 in detail. The ROM 1240, the boot loader 1260, the first firmware 1270_1, and the second firmware 1270_2 of the electronic device 1200 may sequentially determine whether a next layer is falsified.

For example, the ROM code stored in the ROM 1240, when executed, may cause a processor to determine whether the boot loader 1260 being a next layer is falsified, by generating the first device identifier value CDI1 based on the BL hash value corresponding to the boot loader code and the PDS value and comparing the first device identifier value CDI1 and the first endorsement image. Also, the boot loader 1260 (e.g., via boot loader code executed by a processor) may determine whether the first firmware 1270_1 being a next layer is falsified, by generating the second device identifier value CDI2 based on a FW1 hash value corresponding to the first firmware code and the first device identifier value CDI1 and comparing the second device identifier value CDI2 and the second endorsement image. Also, the first firmware 1270_1 (e.g., via firmware code executed by a processor) may determine whether the second firmware 1270_2 being a next layer is falsified, by generating the third device identifier value CDI3 based on a FW2 hash value corresponding to the second firmware code and the second device identifier value CDI2 and comparing the third device identifier value CDI3 and the third endorsement image.

As such, as the layer structure for secure booting is implemented between pieces of firmware, whether the firmware is falsified may be determined more thoroughly.

A secure booting method according to an embodiment of the present disclosure may verify a boot loader code and a firmware code independently using a PDS value, a first endorsement image (L1 Endorsement Image), and a second endorsement image (L2 Endorsement Image) received from a firmware release server. Accordingly, the secure booting may be performed at high speed without a hardware accelerator for executing a public key-based algorithm.

Each of the embodiments provided in the above description is not excluded from being associated with one or more features of another example or another embodiment also provided herein or not provided herein but consistent with the disclosure.

While the disclosure has been particularly shown and described with reference to embodiments thereof, it will be understood that various changes in form and details may be made therein without departing from the spirit and scope of the following claims.

What is claimed is:

1. A booting system comprising:
a firmware release server; and
an electronic device configured to execute a boot loader and first firmware distributed from the firmware release server, the electronic device comprising:
at least one processor;
a first storage unit configured to store a secret value shared with the firmware release server;
a read-only memory (ROM) configured to store a ROM code executable in booting; and
a second storage unit configured to store the boot loader and the first firmware,
wherein the ROM code, when executed, causes the at least one processor to perform a verification operation on the boot loader based on the secret value and a first endorsement image received from the firmware release server, and
wherein the boot loader is configured to perform a verification operation on the first firmware based on a second endorsement image received from the firmware release server.

2. The booting system of claim 1, wherein the firmware release server comprises:
a third storage unit configured to store the secret value; and
an endorsement image generation module configured to generate the first endorsement image and the second endorsement image based on the secret value.

3. The booting system of claim 2, wherein the endorsement image generation module is configured to:
generate the first endorsement image based on a hash value for the boot loader and the secret value; and
generate the second endorsement image based on a hash value for the first firmware and the first endorsement image.

4. The booting system of claim 2, wherein the firmware release server further comprises:
an encryption module configured to:
perform an encryption operation on the first endorsement image and the second endorsement image based on a public key-based encryption algorithm; and
generate an encrypted endorsement image; and
a signature generation module configured to:
perform a signature operation on the encrypted endorsement image based on a public key-based digital signature algorithm; and
generate a signed endorsement image.

5. The booting system of claim 4, wherein the electronic device further comprises:
a signature verification module configured to perform a signature verification operation on the signed endorsement image based on the public key-based digital signature algorithm; and
a decryption module configured to perform a decryption operation on the encrypted endorsement image based on the public key-based encryption algorithm.

6. The booting system of claim 1, wherein the ROM code, when executed, further causes the at least one processor to:
generate a first device identifier value based on a hash value of the boot loader and the secret value; and
compare the first device identifier value and the first endorsement image.

7. The booting system of claim 6, wherein the boot loader is further configured to:

generate a second device identifier value based on a hash value of the first firmware and the first device identifier value; and compare the second device identifier value and the second endorsement image.

8. The booting system of claim 1, wherein the electronic device further comprises:
a third storage unit physically separated from the second storage unit, and configured to store the first endorsement image and the second endorsement image.

9. The booting system of claim 1, wherein the second storage unit is further configured to store second firmware different from the first firmware, and
wherein the first firmware, when executed, causes the at least one processor to perform a verification operation on the second firmware based on a third endorsement image received from the firmware release server.

10. The booting system of claim 9, wherein the firmware release server is configured to:
generate the first endorsement image based on a hash value for the boot loader and the secret value;
generate the second endorsement image based on a hash value for the first firmware and the first endorsement image; and
generate the third endorsement image based on a hash value for the second firmware and the second endorsement image.

11. A booting method of an electronic device, the method comprising:
generating, by executing a read-only memory (ROM) code with at least one processor, a first hash value for a boot loader code;
generating, by executing the ROM code with the at least one processor, a first device identifier value based on the first hash value and a preset secret value;
verifying, by executing the ROM code with the at least one processor, the boot loader code by comparing a first endorsement image received from a firmware release server with the first device identifier value;
based on the boot loader code being valid, executing the boot loader code;
generating, by executing the boot loader code with the at least one processor, a second hash value for a first firmware code;
generating, by executing the boot loader code with the at least one processor, a second device identifier value based on the second hash value and the first device identifier value;
verifying, by executing the boot loader code with the at least one processor, the first firmware code by comparing a second endorsement image received from the firmware release server with the second device identifier value; and
based on the first firmware code being valid, executing the first firmware code with the at least one processor.

12. The method of claim 11, further comprising generating, with the firmware release server, the first endorsement image based on the first hash value for the boot loader code and a pre-installed secret (PDS) value.

13. The method of claim 12, further comprising generating, with the firmware release server, the second endorsement image based on the second hash value for the first firmware code and the first endorsement image.

14. The method of claim 11, wherein the boot loader code and the first endorsement image are concatenated to comprise a boot loader, and wherein the first firmware code and the second endorsement image are concatenated to comprise firmware.

15. The method of claim 11, wherein the first endorsement image and the second endorsement image are stored in a first storage unit, and
wherein the boot loader code and the first firmware code are stored in a second storage unit physically separated from the first storage unit.

16. The method of claim 11, further comprising:
generating, by executing the first firmware code with the at least one processor, a third hash value for second firmware code different from the first firmware code;
generating, by executing the first firmware code with the at least one processor, a third device identifier value based on the third hash value and the second device identifier value;
verifying, by executing the first firmware code with the at least one processor, the second firmware code by comparing a third endorsement image received from the firmware release server with the third device identifier value; and
based on the second firmware code being valid, executing the second firmware code.

17. The method of claim 16, further comprising:
generating, with the firmware release server, the first endorsement image based on the first hash value for the boot loader code and a pre-installed secret (PDS) value;
generating, with the firmware release server, the second endorsement image based on the second hash value for the first firmware code and the first endorsement image; and
generating, with the firmware release server, the third endorsement image based on the third hash value for the second firmware code and the second endorsement image.

18. A method of distributing firmware, the method comprising:
sharing a preset secret value between a firmware release server and an electronic device;
generating a first endorsement image corresponding to a boot loader code and a second endorsement image corresponding to a firmware code;
generating an encrypted endorsement image by encrypting a full endorsement image comprising the first endorsement image and the second endorsement image;
generating a signed endorsement image by generating a digital signature on the encrypted endorsement image;
sending the signed endorsement image from the firmware release server to the electronic device;
performing a signature verification operation for the signed endorsement image;
based on the digital signature being valid, decrypting the encrypted endorsement image;
storing the boot loader code and the first endorsement image in the electronic device as a boot loader; and
storing the firmware code and the second endorsement image in the electronic device as firmware.

19. The method of claim 18, wherein generating the first endorsement image and the second endorsement image comprises:
generating a first hash value corresponding to the boot loader code;
generating the first endorsement image based on the first hash value and the preset secret value;
generating a second hash value corresponding to the firmware code; and generating the second endorsement image based on the second hash value and the first endorsement image.

20. The method of claim 18, wherein generating the signed endorsement image comprises:
   generating a hash value corresponding to the encrypted endorsement image; and
   generating a Rivest-Shamir-Adleman (RSA) algorithm-based digital signature based on the hash value and a public key.

* * * * *